Figure 1:
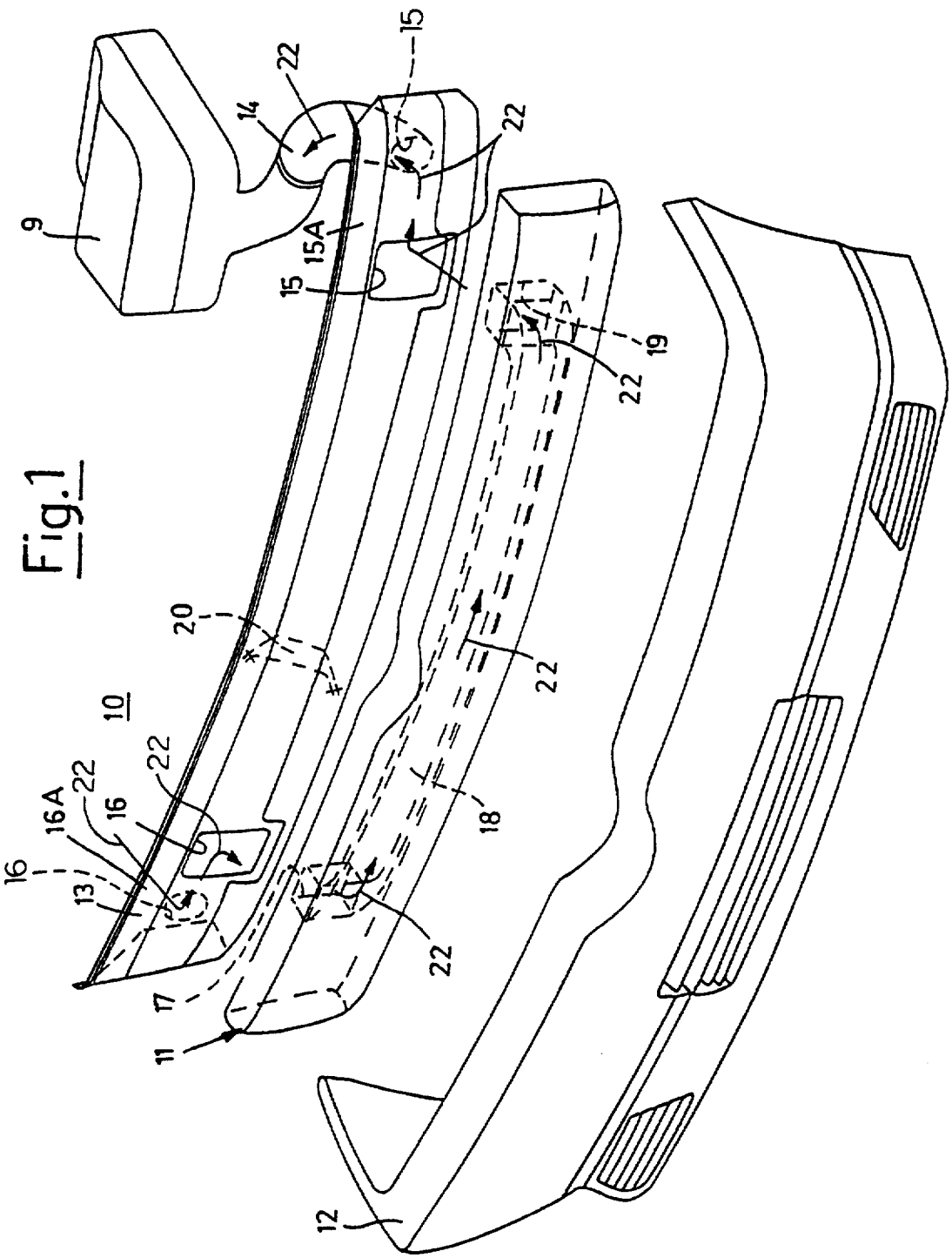

United States Patent [19]

Mendicino

[11] Patent Number: 5,141,068
[45] Date of Patent: Aug. 25, 1992

[54] AIR INTAKE FOR ENGINE FEED

[75] Inventor: Franco Mendicino, Arese, Italy

[73] Assignee: Alfa Lancia S.p.A., Milan, Italy

[21] Appl. No.: 682,677

[22] Filed: Apr. 9, 1991

[30] Foreign Application Priority Data

Apr. 10, 1990 [IT] Italy .................. 19978 A/90

[51] Int. Cl.⁵ .................. B60R 19/18; B60K 13/02
[52] U.S. Cl. .................. 180/68.3; 293/113; 293/117; 296/208
[58] Field of Search .................. 180/68.3, 68.1; 293/113, 117, 122; 296/194, 204, 208

[56] References Cited

U.S. PATENT DOCUMENTS

| | | |
|---|---|---|
| 4,516,650 | 5/1985 | Yamaguchi et al. .......... 180/68.3 |
| 4,610,326 | 9/1986 | Kirchweger et al. .......... 180/68.1 |
| 4,653,788 | 3/1987 | DiGiusto .......... 293/117 |

FOREIGN PATENT DOCUMENTS

| | | | |
|---|---|---|---|
| 3701736 | 8/1988 | Fed. Rep. of Germany ..... 180/68.3 |
| 0172848 | 10/1982 | Japan .......... 293/113 |
| 0249519 | 10/1989 | Japan .......... 180/68.3 |

Primary Examiner—David M. Mitchell
Attorney, Agent, or Firm—Longacre & White

[57] ABSTRACT

An air intake for feeding air to an engine, in which a tubular structure is associated with the cross-member of a vehicle body via a port connected to an aperture in the cross-member. Atmospheric air is drawn through it, along a path external to the engine compartment, and through an induction structure provided within the engine compartment, the tubular structure also acts as a stiffening frame for the vehicle bumper.

5 Claims, 2 Drawing Sheets

AIR INTAKE FOR ENGINE FEED

This invention relates to an extension of an air intake for feeding air to an engine. Air ducts are known to be provided in plastic and non-plastic bumpers which direct flow towards the radiator and/or towards the brakes.

Bumpers of tubular or box structure are known which are structurally designed to absorb a large quantity of energy arising from impact, these bumpers generally support the vehicle fairing or spoiler.

Extending the engine air intake for the purpose of reducing induction noise is known to cause a loss of delivered power. For thermodynamic reasons, power loss is minimized if this extension is external to the vehicle, and in particular external to the engine compartment. An object of the present invention is to utilize the ideal position of the front bumper, which has generally not been associated with the engine air intake. The extension is in the form of a tubular element incorporated into the bumper.

A further object is to provide an engine air conveying element which also stiffens the impact energy absorption of the bumper.

These objects are attained according to the invention by an air intake in which a tubular structure and a bumper exterior member are associated with a vehicle body structural cross-member provided with a plurality of apertures. The tubular structure is a stiffening structure behind the bumper exterior member, and is provided with an internal duct connected at one end to a first of the apertures provided in the structural cross-member of the body and at the other end to a second of the apertures. The internal duct communicates with a conduit feeding air to an engine contained within the body.

According to one embodiment of the present invention, the tubular stiffening structure is blow-moulded plastic material.

Again according to the invention, the tubular stiffening structure provided with the internal duct draws in atmospheric air. The tubular stiffening structure is provided with sealing sleeves connecting the internal duct to the apertures provided in the structural cross-member of the body.

In another embodiment of the present invention, the tubular stiffening structure receives air from the interior of the engine compartment via another conduit provided within the structural cross-member of the body.

Figure 2:
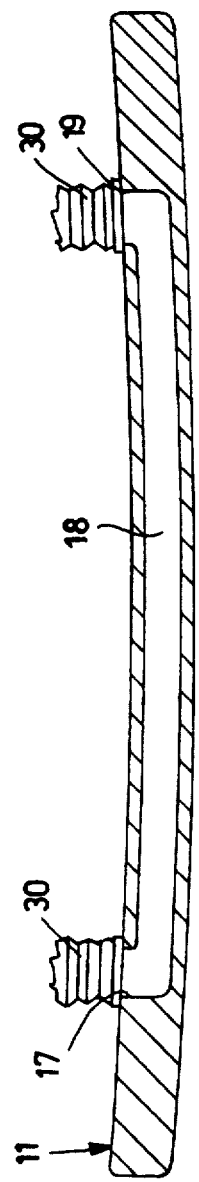

The technical characteristics and further advantages of the present invention are illustrated hereinafter with reference to the accompanying drawings, in which:

FIG. 1 is a exploded perspective view of the component elements of the air intake of the present invention; and FIG. 2 is a section through an element of FIG. 1.

In the figures the reference numeral 11 indicates a tubular stiffening structure of the exterior member 12 of a vehicle bumper.

The tubular stiffening structure 11 is fixed onto a structural cross-member 13 of a vehicle body (not shown). The body defines an engine compartment 10 housing an engine (also not shown) comprising an air intake structure 9 provided with a pipe 14 connected to the first at a pair of apertures 15, which are themselves connected together by a first conduit 15A and are provided at one end of the structural cross-member 13. The other end of the structural cross-member is provided with a further pair of apertures 16 connected together by a second conduit 16A. The second conduit 16A connects the engine compartment 10 and the tubular stiffening structure 11. The tubular stiffening structure 11 comprises a first port 17 in correspondence with and in communication with an aperture 16, an internal duct 18, and a second port 19 in communication with an aperture 15 and consequently with the pipe 14.

Sealing sleeves 30 can be provided between the ports 17 and 19 and the apertures 15 and 16, respectively.

On the cross-member 13 in proximity to the aperture 16 there is provided a wall 20 able to block the air streams which would otherwise be channelled through the box section of the structural cross-member 13 instead of into the tubular stiffening structure 11.

The air can be drawn in either from the interior of the engine compartment 10 via the aperture 16 and the port 17 in the direction of the arrows 22, or in the form of atmospheric air taken either from inside the structural cross-member 13 or directly from the outside.

The air passes through the internal duct 18 to the second port 19 in communication with the pipe 14 and hence to the air intake structure 9.

In this manner the engine induction air follows a longer path equal to the entire length of the tubular element 11, which is also external to the engine compartment 10 and consequently a cold duct. This arrangement also results in a considerable weight saving by combining stiffening and bumper and extending the air intake. Another advantage is greater space availability within the engine compartment and a cleaner overall vehicle appearance. The present invention has been described by way of non-limiting example and modifications can be made thereto by a expert in the art without leaving the scope of protection of the following claims.

I claim:

1. An apparatus for feeding air to an engine of a vehicle, said vehicle including a bumper exterior member supported on a structural cross-member having a plurality of apertures, said apparatus comprising:

a tubular stiffening structure between said bumper exterior member and said structural cross-member, said tubular stiffening structure comprising an internal duct terminating at first and second ports, said first port is in correspondence and air communication with a first of said plurality of apertures and said second port is in correspondence and air communication with a second of said plurality of apertures;

a first conduit through said structural cross-member for air communication between said second aperture and a third of said plurality of apertures; and an air intake for air communication between said third aperture and said engine;

wherein said tubular stiffening structure stiffens said structural cross-member.

2. The apparatus according to claim 1, further comprising a second conduit through said structural cross-member for air communication between said first aperture and a fourth of said plurality of apertures.

3. The apparatus according to claim 2, wherein said fourth aperture is in air communication with an interior of a compartment in said vehicle enclosing said engine.

4. The apparatus according to claim 1, further comprising sealing sleeves for air communication between said first port and said first aperture, as well as between said second port and said second aperture.

5. An air intake as claimed in claim 1, characterised in that said tubular structure is an element of blow-moulded plastic material.

* * * * *